US012780385B1

(12) United States Patent
Anderson, Jr. et al.

(10) Patent No.: US 12,780,385 B1
(45) Date of Patent: *Nov. 3, 2026

(54) MARINE DRIVES HAVING A MUFFLER FOR EXHAUST OUTLET

(71) Applicant: Brunswick Corporation, Mettawa, IL (US)

(72) Inventors: Donald Anderson, Jr., Oshkosh, WI (US); Andrew S. Waisanen, Fond du Lac, WI (US); Jeffrey C. Etapa, Oakfield, WI (US); Steven R. Johns, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 523 days.

This patent is subject to a terminal disclaimer.

(21) Appl. No.: 18/472,471

(22) Filed: Sep. 22, 2023

Related U.S. Application Data

(60) Continuation of application No. 17/224,778, filed on Apr. 7, 2021, now Pat. No. 11,795,858, which is a (Continued)

(51) Int. Cl.
*B63H 20/26* (2006.01)
*B63H 20/24* (2006.01)
*F01N 1/08* (2006.01)
*F01N 13/00* (2010.01)
*F01N 13/08* (2010.01)
(Continued)

(52) U.S. Cl.
CPC ........... *B63H 20/26* (2013.01); *B63H 20/245* (2013.01); *F01N 1/083* (2013.01); *F01N 1/084* (2013.01); *F01N 13/004* (2013.01); *F01N 13/007* (2013.01); *F01N 13/082* (2013.01); *F01N 13/12* (2013.01); *F01N 2590/021* (2013.01); *F02B 61/045* (2013.01)

(58) Field of Classification Search
CPC ..... B63H 20/245; B63H 20/26; F01N 13/004; F01N 13/005; F01N 13/007; F01N 13/082; F01N 13/02; F01N 13/12; F01N 2590/021; F02B 61/045
See application file for complete search history.

(56) References Cited

U.S. PATENT DOCUMENTS 2,082,059 A 6/1937 Irgens
3,045,423 A 7/1962 Hulsebus
(Continued)

FOREIGN PATENT DOCUMENTS

JP 61169391 7/1986

*Primary Examiner* — Ajay Vasudeva
(74) *Attorney, Agent, or Firm* — Andrus Intellectual Property Law, LLP

(57) ABSTRACT

A marine drive has an exhaust outlet on its lower gearcase that discharges a flow of exhaust gas from the engine to seawater in which the marine drive is situated. An exhaust outlet is located on the marine drive above the exhaust outlet and discharges a flow of exhaust gas from the engine to atmosphere around the marine drive at least when the engine is operated at an idle speed. An exhaust outlet is located on the marine drive between the primary and exhaust outlets, and discharges a flow of exhaust gas from the engine to the seawater or to the atmosphere depending upon a current location of the exhaust outlet with respect to the seawater. A muffler is configured to reduce noise emanating from the exhaust outlet.

19 Claims, 10 Drawing Sheets

Related U.S. Application Data division of application No. 15/936,671, filed on Mar. 27, 2018, now Pat. No. 10,995,648.

(51) Int. Cl.
*F01N 13/12* (2010.01)
*F02B 61/04* (2006.01)

(56) References Cited

U.S. PATENT DOCUMENTS

| | | | | | |
|---|---|---|---|---|---|
| 3,434,447 | A | | 3/1969 | Christensen | |
| 3,745,964 | A | | 7/1973 | Henrich | |
| 3,967,446 | A | | 7/1976 | Harralson et al. | |
| 4,070,983 | A | * | 1/1978 | Randall | B63H 20/245 440/89 R |
| 4,601,666 | A | | 7/1986 | Wood, Jr. | |
| 4,897,061 | A | | 1/1990 | Koepsel | |
| 4,906,214 | A | | 3/1990 | Towner | |
| 4,966,567 | A | | 10/1990 | Breckenfeld et al. | |
| 5,299,961 | A | * | 4/1994 | Okamoto | B63H 20/245 440/89 R |
| 5,498,182 | A | | 3/1996 | Anselm et al. | |
| 5,674,099 | A | | 10/1997 | Muramatsu et al. | |
| 5,759,073 | A | | 6/1998 | Sumino et al. | |
| 5,807,151 | A | | 9/1998 | Sumino | |
| 5,954,554 | A | | 9/1999 | Bates | |
| 6,010,380 | A | | 1/2000 | Wollard | |
| 6,027,385 | A | | 2/2000 | Katayama et al. | |
| 6,632,110 | B2 | | 10/2003 | Kato | |
| 7,387,556 | B1 | | 6/2008 | Davis | |
| 7,556,548 | B2 | * | 7/2009 | Konakawa | F01N 13/12 440/89 C |
| 7,762,772 | B1 | | 7/2010 | Alby et al. | |
| 8,998,663 | B1 | | 4/2015 | Bonde et al. | |
| 9,308,980 | B1 | | 4/2016 | Bonde et al. | |
| 9,376,194 | B1 | | 6/2016 | Jensen et al. | |
| 9,376,195 | B1 | | 6/2016 | Jaszewski et al. | |
| 10,995,648 | B1 | | 5/2021 | Anderson, Jr. | |
| 11,795,858 | B1 | * | 10/2023 | Anderson, Jr. | B63H 20/26 |

* cited by examiner

MARINE DRIVES HAVING A MUFFLER FOR EXHAUST OUTLET

CROSS-REFERENCE TO RELATED APPLICATIONS

This application is a continuation of U.S. patent application Ser. No. 17/224,778, filed Apr. 7, 2021, which application is a divisional of U.S. patent application Ser. No. 15/936,671, filed Mar. 27, 2018, which application issued on May 4, 2021 as U.S. Pat. No. 10,995,648. Both of which applications are incorporated herein by reference in their entirety.

FIELD

The present disclosure relates to marine drives for propelling marine vessels in water, and more particularly to apparatuses for reducing exhaust sound emanating from marine drives.

BACKGROUND

The following U.S. patents are incorporated herein by reference:

U.S. Pat. No. 9,376,194 discloses idle relief mufflers configured to discharge exhaust gases from an outboard motor to atmosphere surrounding the outboard motor when an internal combustion engine of the outboard motor is operated at idle and at low speeds. The idle relief mufflers comprise a housing having an open interior, an inlet port configured to convey the exhaust gases to the open interior, and an outlet port configured to discharge the exhaust gases from the open interior. An exhaust grommet is connected to the outlet port. The exhaust grommet comprises a body that is configured to engage with a cowl of the outboard motor and an extension that extends through the outlet port and protrudes into the open interior. The extension and the body together define a through-bore that is configured to convey the exhaust gases from the open interior to the atmosphere.

U.S. Pat. No. 9,376,195 discloses an outboard motor having an engine having an exhaust gas discharge opening, a midsection housing coupled below and supporting the engine, and an exhaust pipe having an exhaust inlet in fluid communication with the exhaust gas discharge opening. The exhaust pipe extends downwardly to a primary exhaust outlet. An idle relief port in the exhaust pipe is located in a fluid path between the exhaust inlet and the primary exhaust outlet. A sound-attenuating plenum chamber has an interior that is in fluid communication with an interior of the exhaust pipe by way of the idle relief port. The plenum chamber is a separate component that is exterior to the midsection housing, and exhaust gas flows from the interior of the exhaust pipe to the interior of the plenum chamber without first flowing through the midsection housing.

U.S. Pat. No. 9,308,980 discloses an outboard motor having an adapter plate that supports an internal combustion engine, a driveshaft housing disposed below the adapter plate, and a lower cowl. A lower cowl volume is defined between the adapter plate, cowl and driveshaft housing. A lower cowl volume inlet is configured to supply idle relief exhaust gases to the lower cowl volume and a lower cowl volume outlet is configured to discharge idle relief exhaust gases from the lower cowl volume to atmosphere. The lower cowl volume is configured to cause expansion of the relief exhaust gases prior to discharge of the idle relief exhaust gases to atmosphere.

U.S. Pat. No. 8,998,663 discloses an outboard motor and a method of making an outboard motor, which provide an exhaust conduit having a first end that receives exhaust gas from an internal combustion engine and a second end that discharges exhaust gas to seawater via a propeller shaft housing outlet. An exhaust conduit opening is formed in the exhaust conduit between the first and second ends. The exhaust conduit opening is for discharging exhaust gas from the exhaust conduit to atmosphere via a driveshaft housing of the outboard motor and via an idle exhaust relief outlet and a driveshaft housing outlet in the driveshaft housing. The driveshaft housing outlet is vertically located between the propeller shaft housing outlet and the idle exhaust relief outlet. A cooling pump pumps cooling water from a cooling water inlet for cooling the internal combustion engine to a cooling water outlet for discharging cooling water from the outboard motor. The exhaust conduit opening and cooling water outlet are configured such that the cooling water collects by gravity in the driveshaft housing to a level that is above the exhaust conduit opening.

U.S. Pat. No. 7,387,556 discloses an exhaust system for a marine propulsion device that directs a flow of exhaust gas from an engine located within the marine vessel, and preferably within a bilge portion of the marine vessel, through a housing which is rotatable and supported below the marine vessel. The exhaust passageway extends through an interface between stationary and rotatable portions of the marine propulsion device, through a cavity formed in the housing, and outwardly through hubs of pusher propellers to conduct the exhaust gas away from the propellers without causing a deleterious condition referred to as ventilation.

U.S. Pat. No. 4,897,061 discloses a marine propulsion system in which exhaust is routed through an internal exhaust passage which includes a convergent area forming a restricted flow path includes a pressure relief opening formed adjacent the area of restricted exhaust flow for relieving exhaust pressure. One or more closure plates are connected adjacent the one or more openings to selectively control the passage of exhaust there through. The plates are biased toward a closed position in which exhaust is prevented from passing through the openings. The bias on the plates is designed so as to yield to a predetermined level of exhaust pressure within the exhaust passage at the area of restricted exhaust flow, to thereby relieve exhaust pressure build-up and improve the performance of the marine propulsion system.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

In certain non-limiting examples disclosed herein, A marine drive is for propelling a marine vessel in water. The marine drive comprises an engine, a first exhaust outlet configured to discharge a first flow of exhaust gas from the engine to the water, wherein the marine drive is configured such that the first exhaust outlet is located in the water when the marine drive is at rest and when the marine drive is operated at an idle speed, a second exhaust outlet located above the first exhaust outlet and configured to discharge a second flow of exhaust gas from the engine to the water, wherein the marine drive is further configured such that the second exhaust outlet is located in the water when the marine drive is at rest and when the marine drive is operated at an idle speed, and a muffler configured to reduce noise emanating from the secondary exhaust outlet.

BRIEF DESCRIPTION OF THE DRAWINGS

The present disclosure is described with reference to the following Figures. The same numbers are used throughout the figures to reference like features and like components.

DETAILED DESCRIPTION OF THE DRAWINGS

The present disclosure improves upon the apparatuses and methods disclosed in U.S. Pat. No. 8,998,663. In general, the '663 patent discloses an outboard motor having an exhaust conduit that receives exhaust gas from an internal combustion engine and discharges the exhaust gas to the surrounding seawater via an underwater outlet through the propeller. In addition, an opening is formed in the exhaust conduit and permits discharge of exhaust gas to atmosphere via a driveshaft housing of the outboard motor, and specifically via one or both of an idle exhaust relief outlet located with or above a midsection of outboard motor and an outlet located below the idle exhaust relief outlet, closer to the lower end of the driveshaft housing of the outboard motor.

Present FIGS. 1-4 are taken from the '663 patent and schematically depict the flow of exhaust gases during different operational states of the above-noted outboard motor disclosed in the '663 patent.

Figure 1:
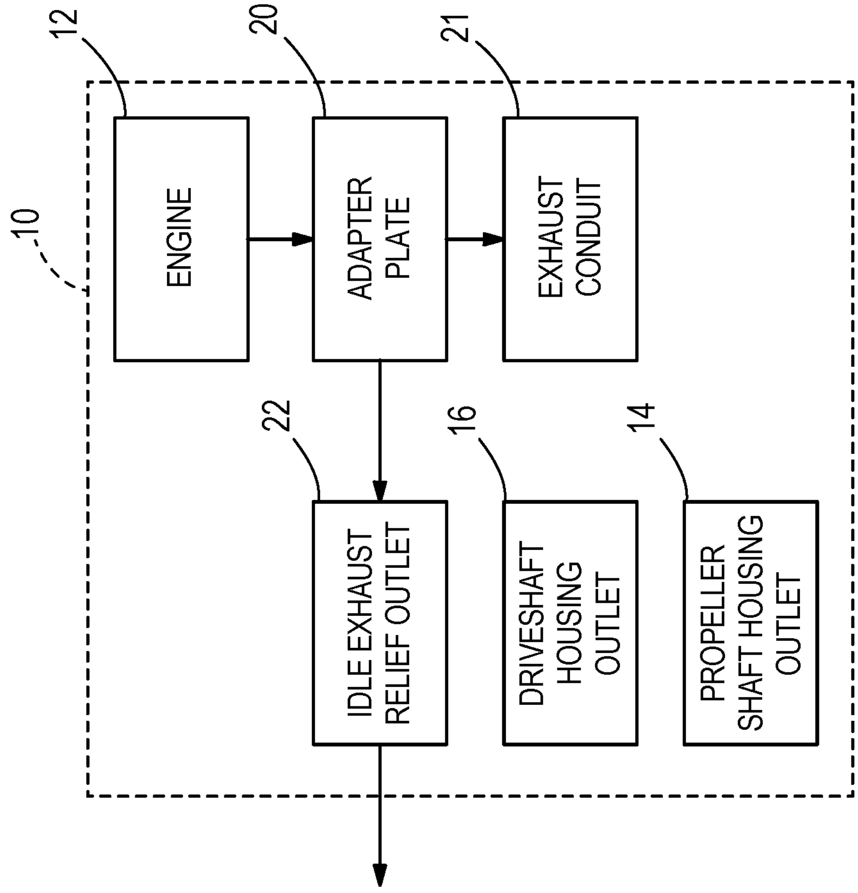
FIG. 1 PRIOR ART

In particular, FIG. 1 includes arrows depicting flow of exhaust gas through the outboard motor 10 when the internal combustion engine 12 is operated in neutral gear. In this operational state, the propeller shaft housing outlet 14 and driveshaft housing outlet 16 are located below the level of seawater surrounding the outboard motor 10. The relatively low flow rate of the exhaust gas through the exhaust conduit 21 and the relative size/geometry of the openings are such that little or no exhaust gas flows through the propeller shaft housing outlet 14 and drive shaft housing outlet 16. The propeller is not spinning, so it has little or no effect on exhaust gas flow. Thus, exhaust gas primarily flows through the idle exhaust relief outlet 22 located near the adapter plate 20.

FIG. 1 also depicts flow of exhaust gas through the outboard motor 10 when the outboard motor 10 is operated in reverse gear at idle and a first, relatively low speed (i.e. a first reverse speed). The propeller shaft housing outlet 14 and driveshaft housing outlet 16 remain under water. A slightly higher pressure exists at the propeller shaft housing outlet 14 due to the spinning propeller. This prevents exhaust gas from flowing through the propeller shaft housing outlet 14. Thus, most or all of the exhaust gas flows through the idle exhaust relief outlet 22.

Figure 2:
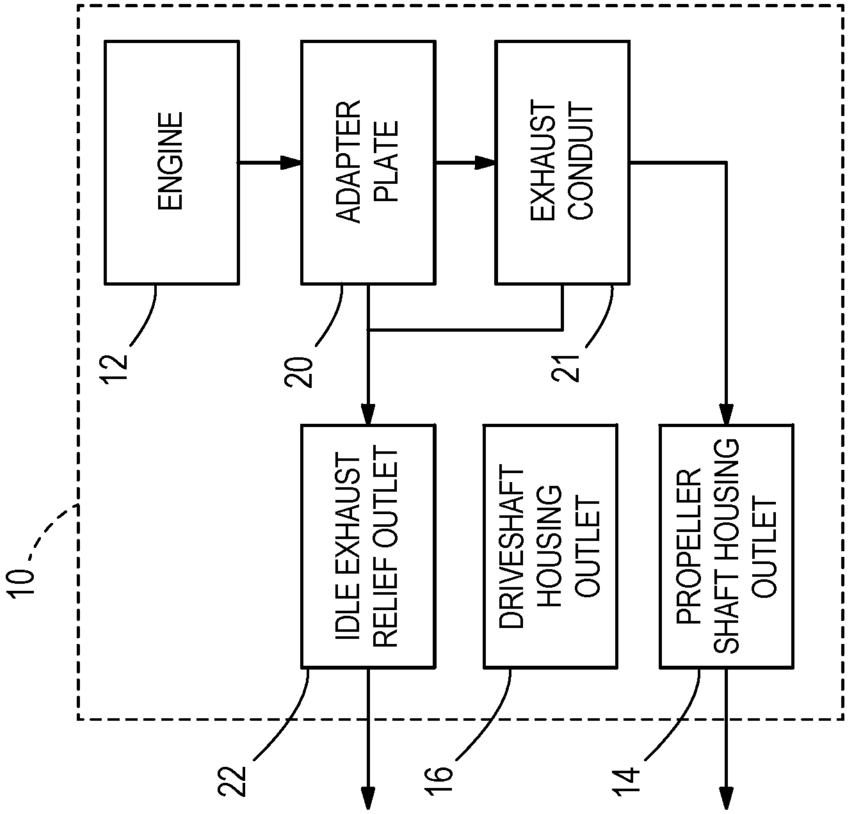
FIG. 2 PRIOR ART
FIGS. 1-4 are schematic views taken from U.S. Pat. No. 8,998,663 and show flow of exhaust gas through the marine drive during different respective operational states.

FIG. 2 includes arrows depicting flow of exhaust gas through the outboard motor 10 when the outboard motor 10 is operated in forward gear at idle or relatively low speeds. In this state, both the propeller shaft housing outlet 14 and the driveshaft housing outlet 16 remain underwater. The relatively low flow rate of the exhaust gas and the relative size/geometry of the outlets 14, 16, 22 are such that little or no exhaust gas flows through the driveshaft housing outlet 16. The slightly lower pressure at the propeller shaft housing outlet 14 caused by the spinning propeller causes the exhaust gas to primarily flow out of the lower gearcase via the propeller shaft housing outlet 14. A relatively smaller portion of exhaust gas flows out of the outboard motor 10 via the idle exhaust relief outlet 22.

Figure 3:
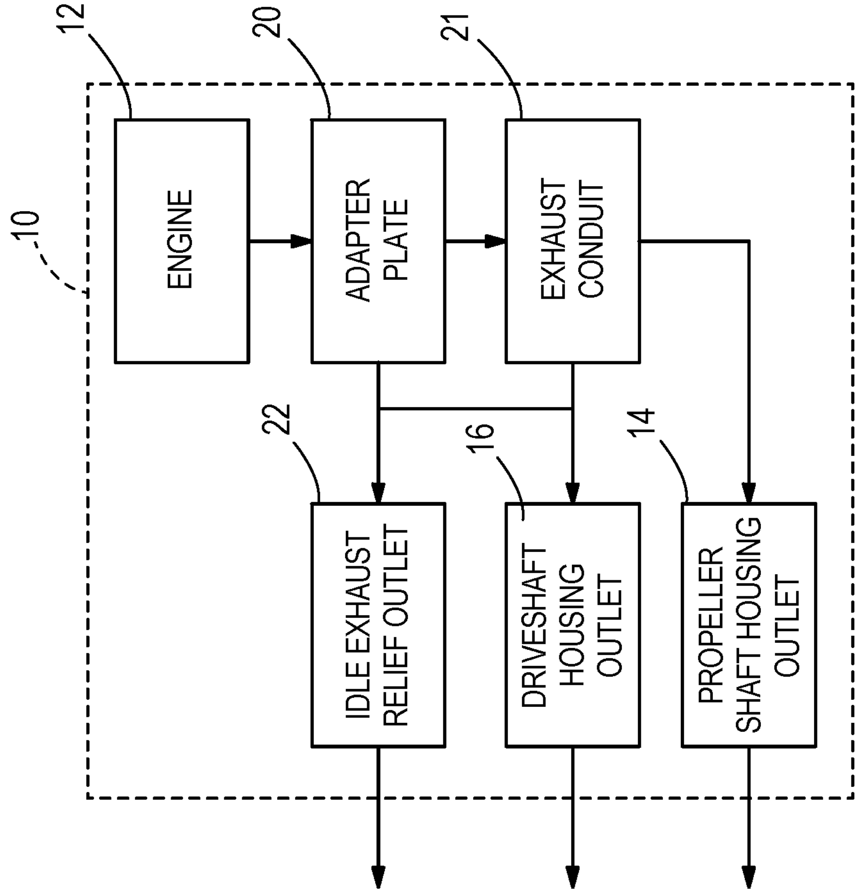
FIG. 3 PRIOR ART

FIG. 3 includes arrows depicting flow of exhaust gas through the outboard motor 10 when it is operated in forward gear at relatively high speeds. In this operational state, the propeller shaft housing outlet 14 remains underwater, however the driveshaft housing outlet 16 will have a tendency to become exposed above seawater, or reside very close to above seawater. This is due to the displacement of seawater as the marine vessel is moving forward. The majority of exhaust gas is discharged through the propeller shaft housing outlet 14, but the portion of the exhaust gas that passes through the exhaust conduit opening will now exit through the idle exhaust relief outlet 22 and driveshaft housing outlet 16. A relatively smaller portion of exhaust gas flows out of the outboard motor 10 via the idle exhaust relief outlet 22.

Figure 4:
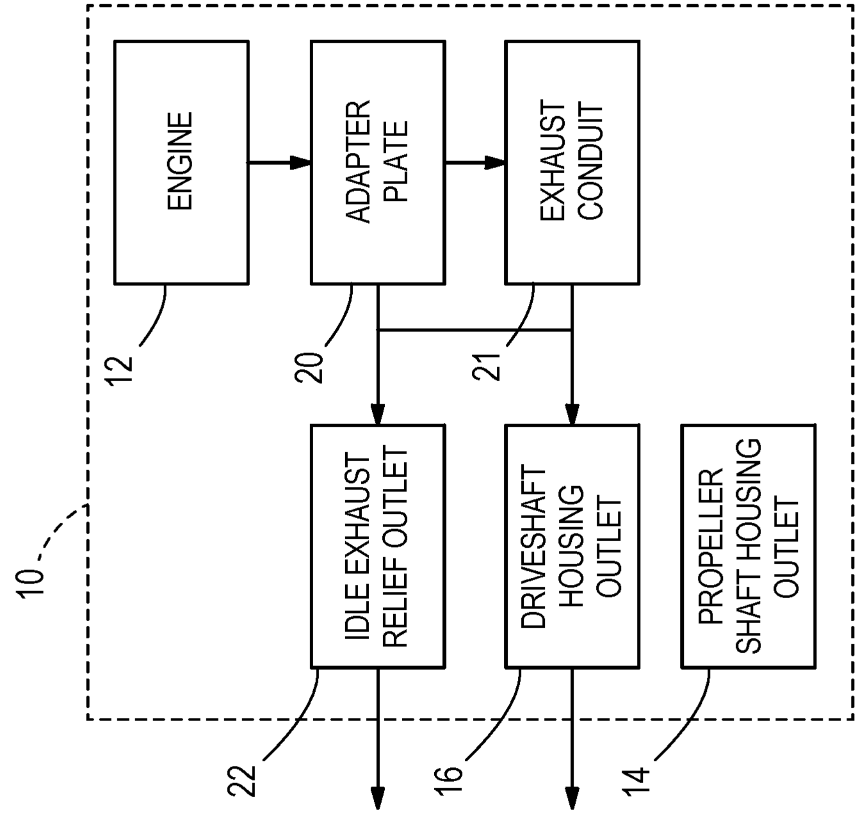
FIG. 4 PRIOR ART

FIG. 4 includes arrows depicting flow of exhaust gas through the outboard motor 10 when the outboard motor 10 is operated in reverse gear at a second, relatively higher speed (i.e. a second reverse speed that is higher than the first reverse speed). As engine speed increases in reverse gear operation, exhaust gas flow increases. Exhaust gas continues to flow through the idle exhaust relief outlet 22, and at a critical engine speed value the exhaust gas begins to flow through the driveshaft housing outlet 16. At this point, exhaust gas will have a tendency not to flow through the propeller shaft housing outlet 14.

FIG. 3 also depicts flow of exhaust gas through the outboard motor 10 when the outboard motor 10 is operated in reverse gear at a third, relatively higher reverse speed (i.e. a third reverse speed that is higher than the second reverse speed). At a certain critical engine speed value, exhaust gas will begin to flow through the propeller shaft housing outlet 14. As described in the '663 patent, inclusion of the exhaust conduit opening in the outboard motor 10 has little discernible effect on the critical engine speed value at which exhaust gas begins to flow through both the idle exhaust relief outlet 22 and the driveshaft housing outlet 16. However, inclusion of the exhaust conduit opening surprisingly does have an increasing effect on the critical engine speed value at which the exhaust gas begins to flow through the gear case and propeller shaft housing and ventilate the propeller blades. Thus the inclusion of the exhaust conduit opening allows the internal combustion engine 12 to run at a greater speed before ventilation of the propeller occurs— thereby allowing it to produce an increased amount of reverse thrust compared to other outboard motor arrangements.

As further explained in the '663 patent, the above-described marine drive arrangements provide certain functional advantages for marine drives, particularly those that require a relatively large amount of thrust in reverse gear, such as joystick piloted marine drives.

Through research and experimentation with the outboard motors disclosed in U.S. Pat. No. 8,998,663 and described herein above, the present inventors have determined that it would be beneficial to achieve the reverse-thrust improvements described in the '663 patent in a manner that does not sacrifice quiet operation of the marine drive. Upon this realization, the present inventors further determined that it would be beneficial to provide a modular muffler design for quieting exhaust noise via the exhaust outlet (e.g., 16), wherein the modular muffler design provides the option of installing the muffler only on certain marine drives that require this enhancement, thus preventing additional cost and weight penalties on various outboard motor configurations.

FIGS. 5-8 depict portions of a marine drive including a first embodiment of a muffler according to the present disclosure. The type and configuration of the marine drive can vary from what is shown. In the illustrated example, the marine drive is an outboard motor 28, however in other examples the marine drive could be a stern drive, inboard drive, inboard-outboard drive and/or the like. As in the above-described embodiments of the '663 patent, the outboard motor 28 has an internal combustion engine 29 (shown schematically) that causes rotation of a generally vertically extending driveshaft 32. The driveshaft 32 extends from the internal combustion engine 29 into a driveshaft housing 34 located below the internal combustion engine 12. A lower gearcase housing 36 is located below the driveshaft housing 34 and contains a transmission gearset 38 (shown schematically) that operably connects the driveshaft 32 to a generally horizontally extending propeller shaft 40. The propeller shaft 40 laterally extends from the lower gearcase housing 36 and supports a propeller 42 such that rotation of the propeller shaft 40 causes rotation of the propeller 42. Thus, operation of the internal combustion engine 29 causes rotation of the driveshaft 32, which in turn causes rotation of the propeller shaft 40 and propeller 42, all as is conventional. The transmission gearset 38 can be actuated by a conventional shift actuator (not shown) to control the rotational direction of the propeller shaft 40 and propeller 42 in either forward, neutral, or reverse gears, all as is conventional.

Figure 5:
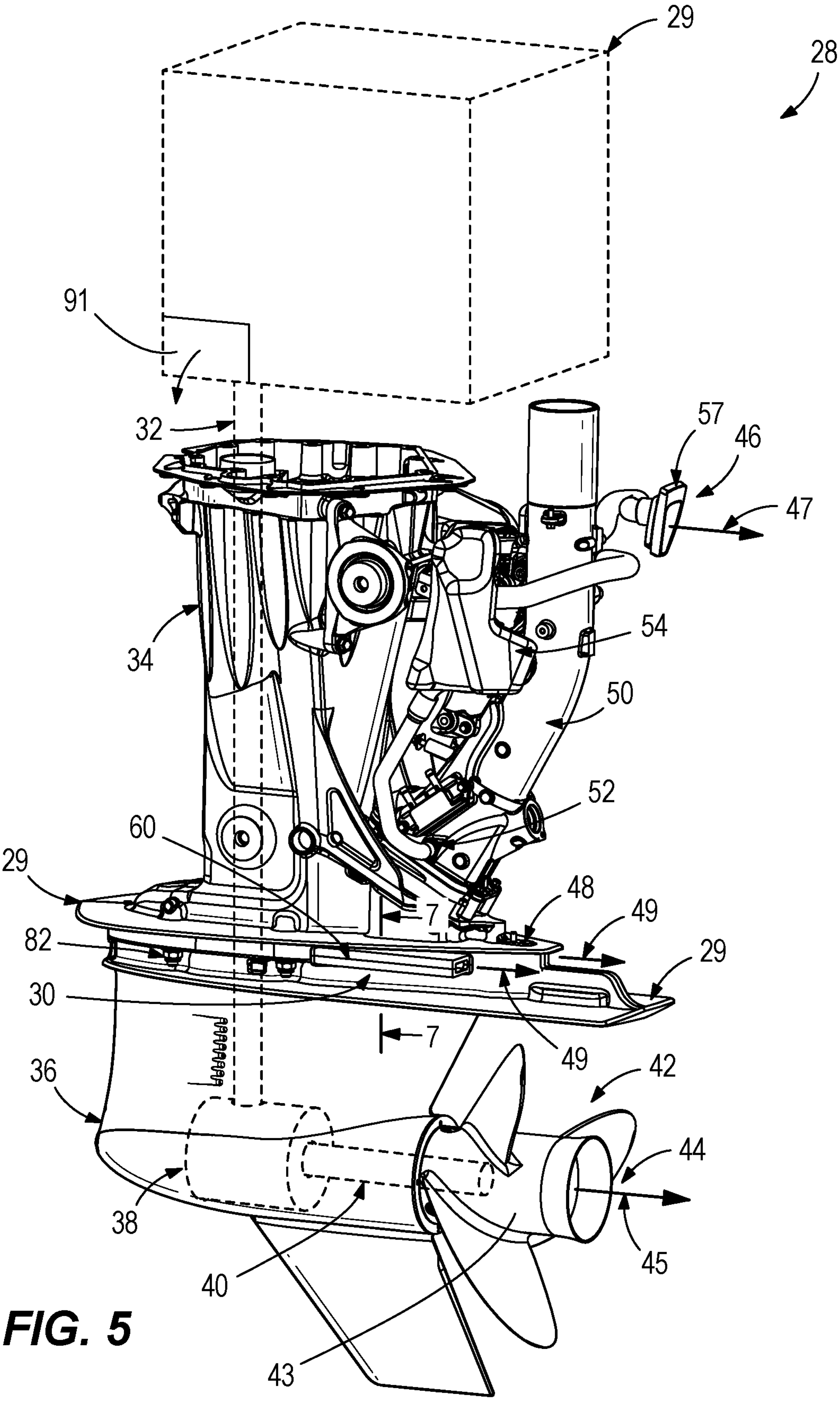
FIG. 5 is a side perspective view of portions of the outboard motor and depicts exhaust flow out of the exhaust outlets.

As shown in FIG. 5, the outboard motor 28 has an exhaust outlet 44 from the lower gearcase housing 36 via the hub 43 of propeller 42. The exhaust outlet 44 discharges a flow of exhaust gas 45 from the internal combustion engine 29 directly to the seawater in which the outboard motor 28 is situated, as described herein above with reference to FIGS. 1-4 (see underwater propeller shaft housing outlet 14). In the presently illustrated example, the exhaust outlet 44 receives the flow of exhaust gas 45 from an exhaust conduit 50 that extends from the internal combustion engine 29 and vertically downwardly alongside the driveshaft housing 34. The flow of exhaust gas 45 is communicated (as further described herein below) from the exhaust conduit 50 to the lower gearcase housing 36 and then to the exhaust outlet 44 via the hub 43 of the propeller 42.

The outboard motor 28 also has an exhaust outlet 46 (idle relief) located on the outboard motor 28 above the exhaust outlet 44, generally located near the top of the driveshaft housing 34. The exhaust outlet 46 discharges a flow of exhaust gas 47 from the internal combustion engine 29 at least when the internal combustion engine 29 is operated at idle speeds, as described herein above with reference to FIGS. 1-4 (see idle exhaust relief outlet 22). The exhaust outlet 46 remains above water during all operational states of the outboard motor 28. The exhaust outlet 46 receives the flow of exhaust gas 47 from an opening 52 in the exhaust conduit 50, wherein the flow of exhaust gas 47 flows from the exhaust conduit 50 to an idle relief muffler 54, and from the idle relief muffler 54 to atmosphere via an idle relief grommet 57. Examples of the flow of exhaust gas 47, idle relief muffler 54 and idle relief grommet 57 are more fully disclosed in the above-incorporated U.S. Pat. Nos. 9,376,194 and 9,376,195.

The outboard motor 28 also has an exhaust outlet 48 located on the outboard motor 28 vertically between the exhaust outlets 44, 46. In the illustrated example, the exhaust outlet 48 is located proximate to the union between the driveshaft housing 34 and lower gearcase housing 36 and adjacent to the cavitation plate 29 on the lower gearcase housing 36; however the location can vary from what is shown. The exhaust outlet 48 discharges a flow of exhaust gas 49 from the internal combustion engine 12 to the seawater or to the atmosphere depending on a current location of the exhaust outlet 48 with respect to the seawater, as described herein above with reference to FIGS. 1-4 (see driveshaft housing outlet 16).

Figure 6:
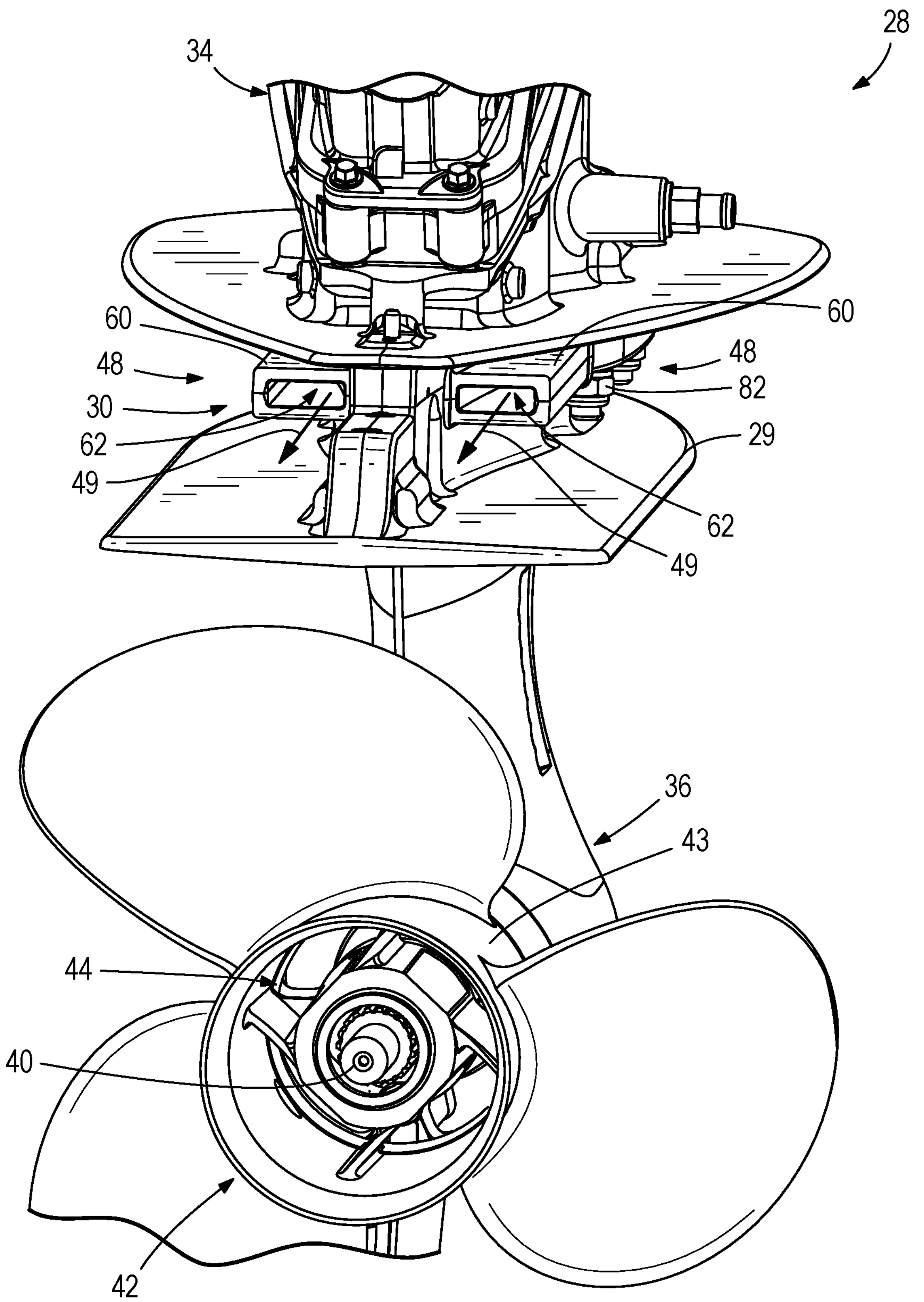
FIG. 6 is a partial rear view of the exhaust outlets.
Figure 7:
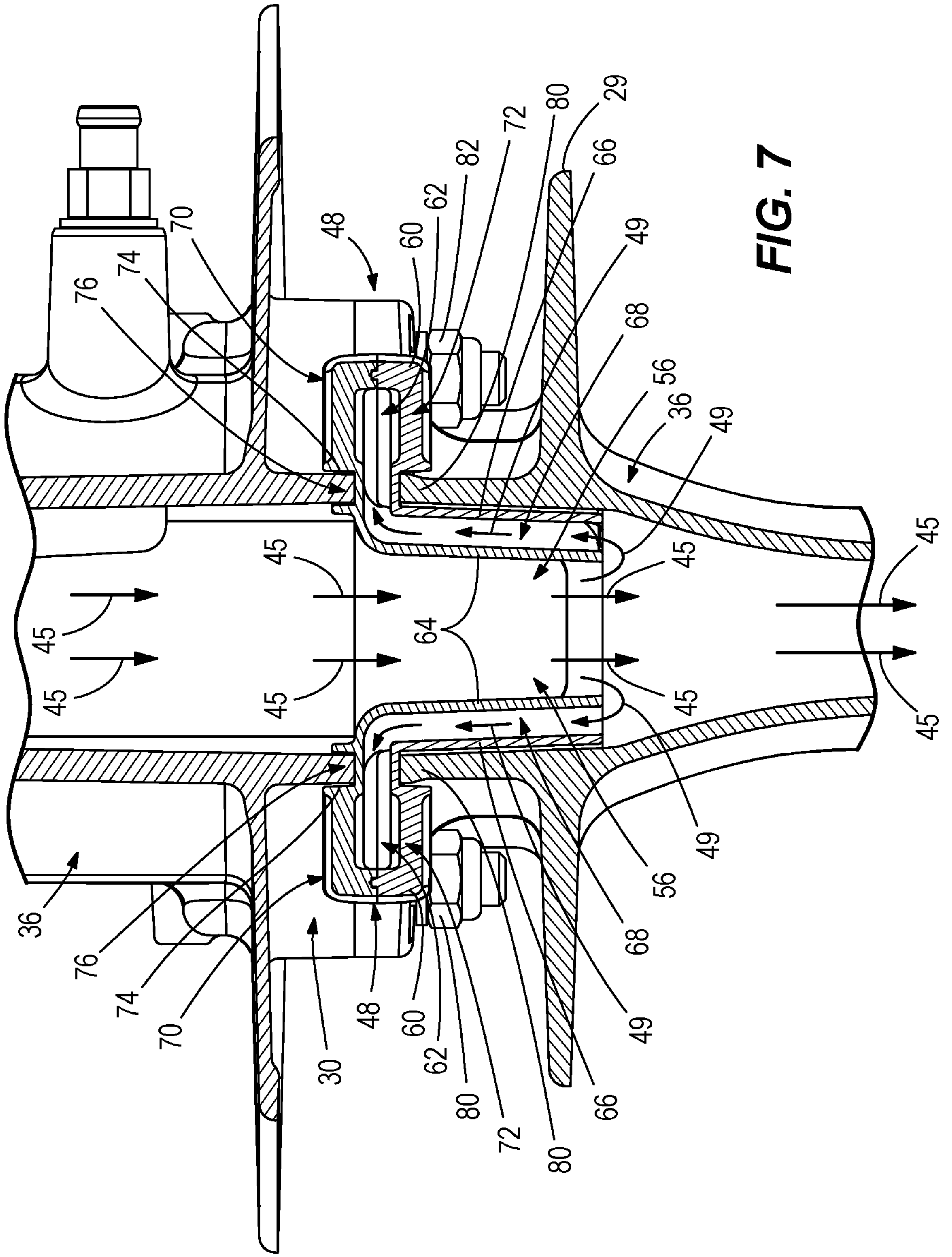
FIG. 7 is a view of section 7-7, taken in FIG. 5.
Figure 8:
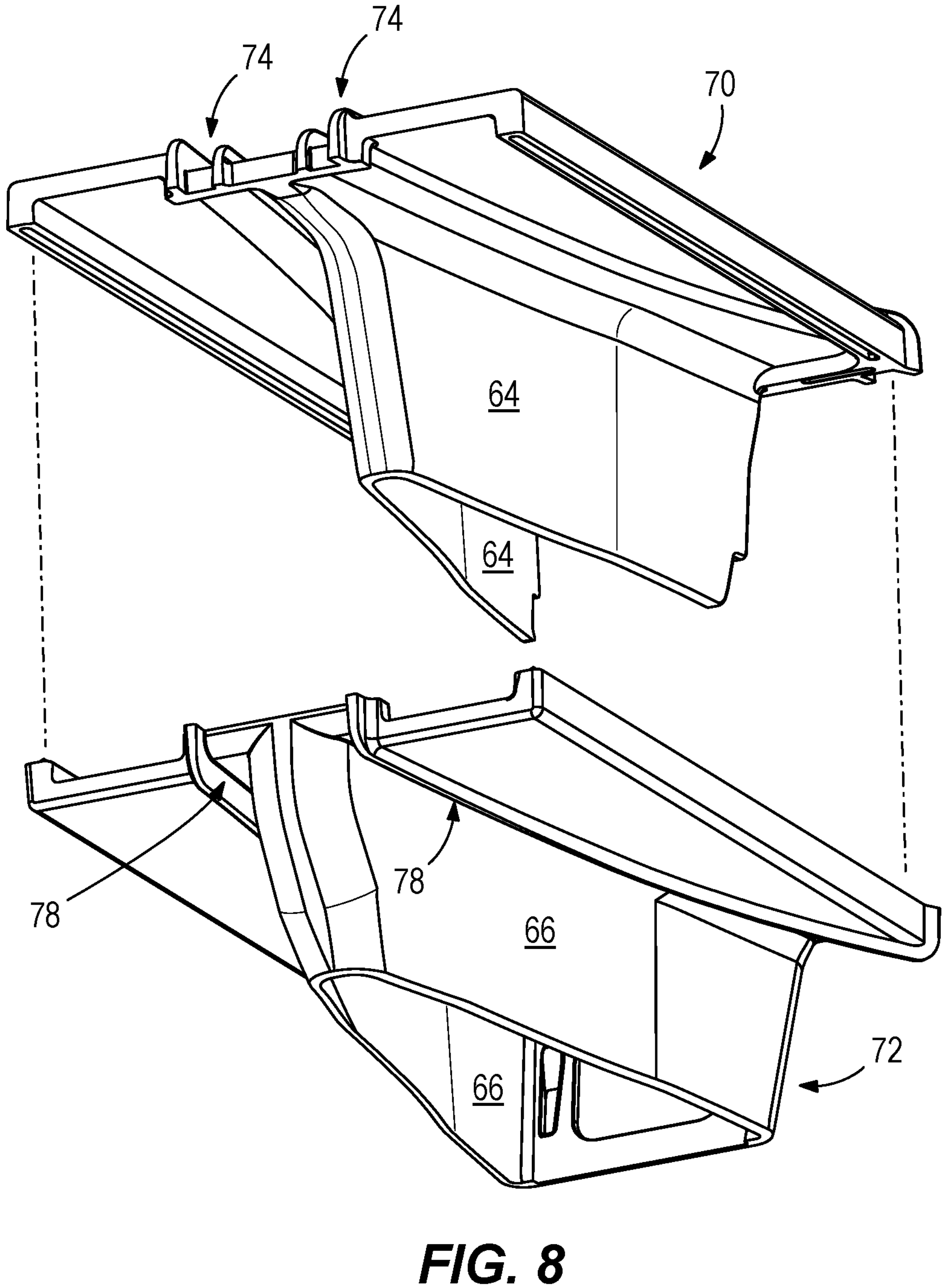
FIG. 8 is an exploded view of a first embodiment of a muffler configured to reduce exhaust gas noise emanating from the outboard motor via an exhaust outlet.
Figure 10:
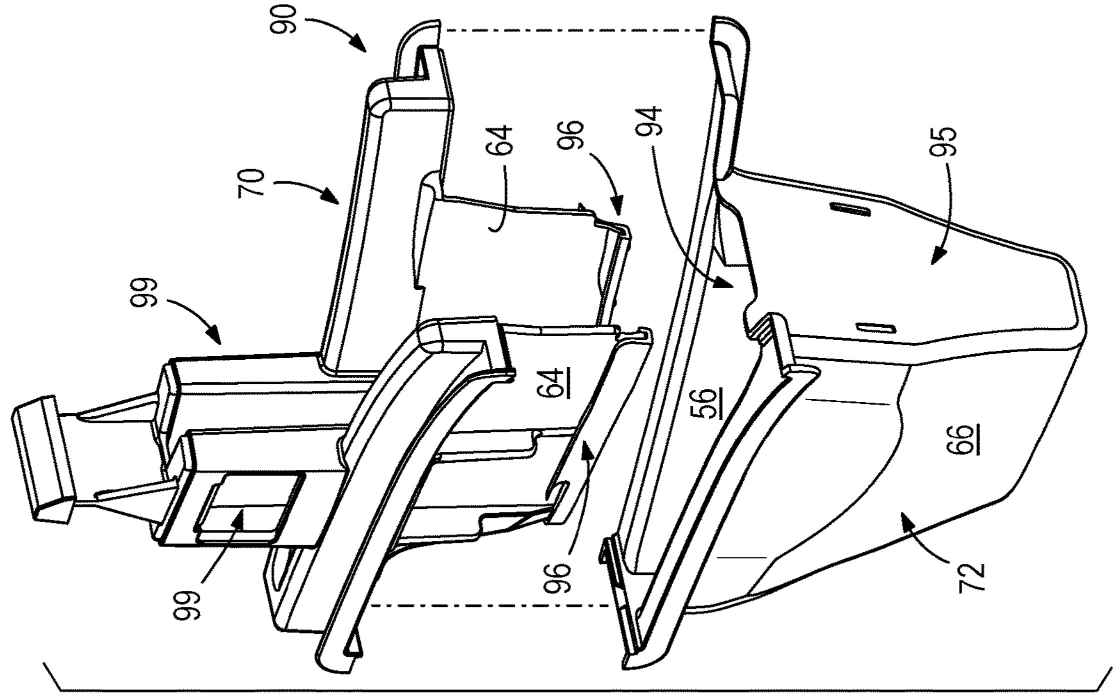
FIG. 10 is an exploded view of the second embodiment.

FIGS. 6-8 depict a first embodiment of a muffler 30 for controlling exhaust noise associated with the exhaust outlet 48 according to the present disclosure. The muffler 30 is located between the driveshaft housing 34 and the lower gearcase housing 36, and in this example is sandwiched between the driveshaft housing 34 and the lower gearcase housing 36 and is partially disposed in (e.g. extends down into) the lower gearcase housing 36, as shown in FIG. 7. The muffler 30 has an expansion chamber 56 that promotes expansion of the flow of exhaust gas 49 therein, and in this example also provides a pathway (shown by arrows 45 in FIG. 7) for the flow of exhaust gas 45 to flow there through. The muffler 30 further has port and starboard wings 60 that laterally extend from port and starboard sides of the expansion chamber 56 and are sandwiched between the driveshaft housing 34 and lower gearcase housing 36. Port and starboard aftwardly-oriented outlet channels 62 are formed in the port and starboard wings 60, respectively, and are configured to discharge the flow of exhaust gas 49 from the expansion chamber 56. Although the illustrated examples show the muffler 30 being sandwiched between the driveshaft housing 34 and lower gearcase housing 36, it will be understood by those having ordinary skill in the art that the muffler 30 could instead be sandwiched between an extension of either or both of the driveshaft housing 34 and the lower gearcase housing 36. Thus, it will be seen by those having ordinary skill in the art that the muffler 30 is a modular device that can be easily installed on various marine drive configurations, as mentioned herein above.

The flow of exhaust gas 49 follows a tortuous path from the expansion chamber 56 to the exhaust outlet 48. Specifically, the expansion chamber 56 has inner sidewalls 64 and outer sidewalls 66. Port and starboard passageways 68 vertically extend between the inner and outer sidewalls 64, 66 and are connected to the port and starboard outlet channels 62, respectively. Thus, in this embodiment, the flow of exhaust gas 45 is conveyed downwardly through and past the expansion chamber 56 and to the lower gearcase housing 36 for discharge via the exhaust outlet 44 through the propeller hub 41. The flow of exhaust gas 49 is a portion the flow of exhaust gas 45 that separates from the flow of exhaust gas 45 and flows upwardly through the port and starboard passageways 68 and then aftwardly through the port and starboard outlet channels 62 for discharge from the outboard motor 10. The present inventors have determined that the cross-sectional shapes, sizes and lengths of the passageways 68 and outlet channels 62 are parameters that can be purposefully designed through research and experimentations so as to achieve a preferred exhaust noise associated with the flow of exhaust gas 49.

Referring to FIGS. 7 and 8, the muffler 30 can include a housing formed from a top portion 70 that is nested in a bottom portion 72. The top portion 70 provides the inner sidewalls 64 and the bottom portion 72 provides the outer sidewalls 66. The port and starboard passageways 68 are defined between the inner and outer sidewalls 64, 66. The top portion 70 has port and starboard alignment channels 74 that receive lower edges 76 of the driveshaft housing 34 when the muffler 30 is sandwiched between the driveshaft housing 34 and the lower gearcase housing 36. The bottom portion 72 has port and starboard alignment channels 78 (see FIG. 8) that receive upper edges 80 of the lower gearcase housing when the muffler 30 is sandwiched between the driveshaft housing 34 and the lower gearcase housing 36. Bolts 82 can be used to secure the assembly together so as to clamp the muffler 30 between the respective components.

Figure 9:
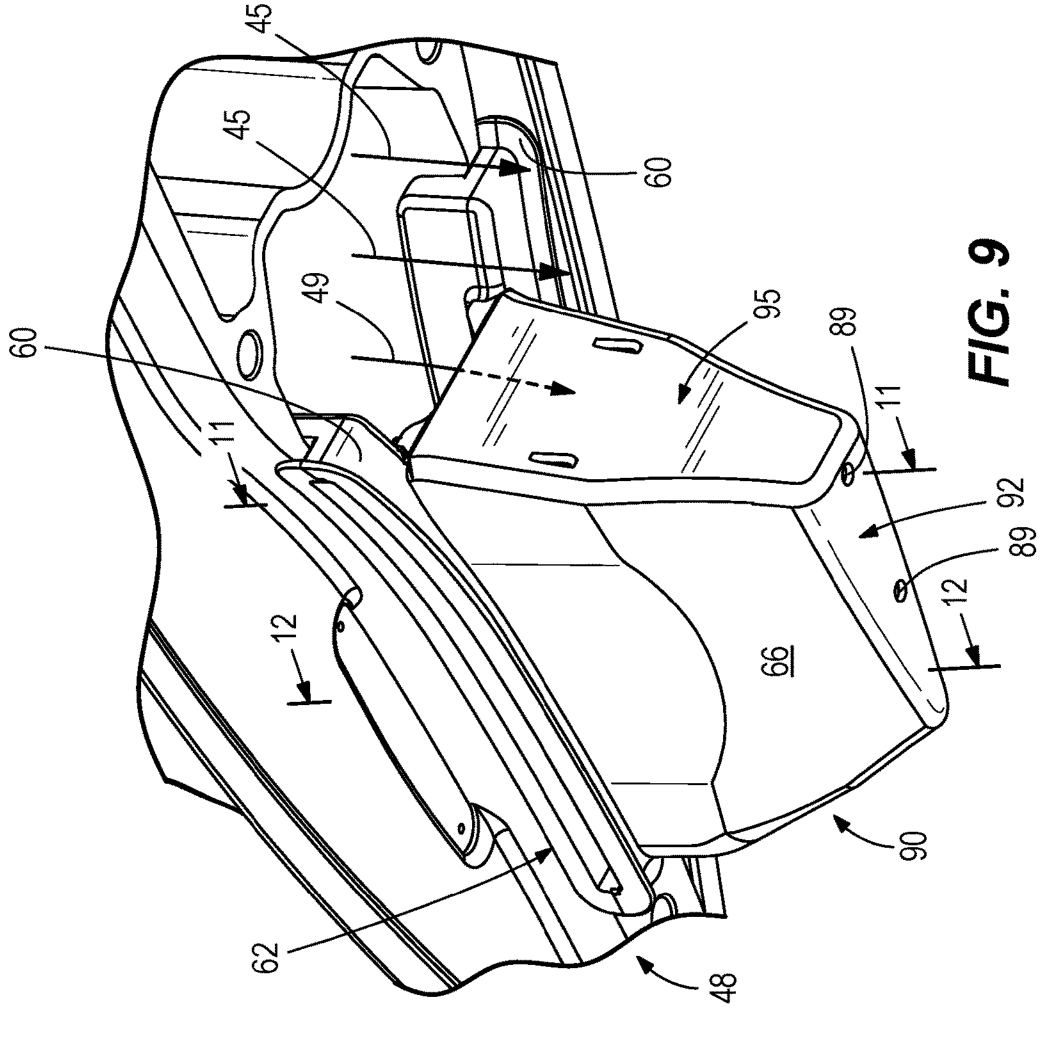
FIG. 9 is a perspective view, looking up at a second embodiment of a muffler configured to reduce exhaust gas noise emanating from the outboard motor via the exhaust outlet.
Figure 11:
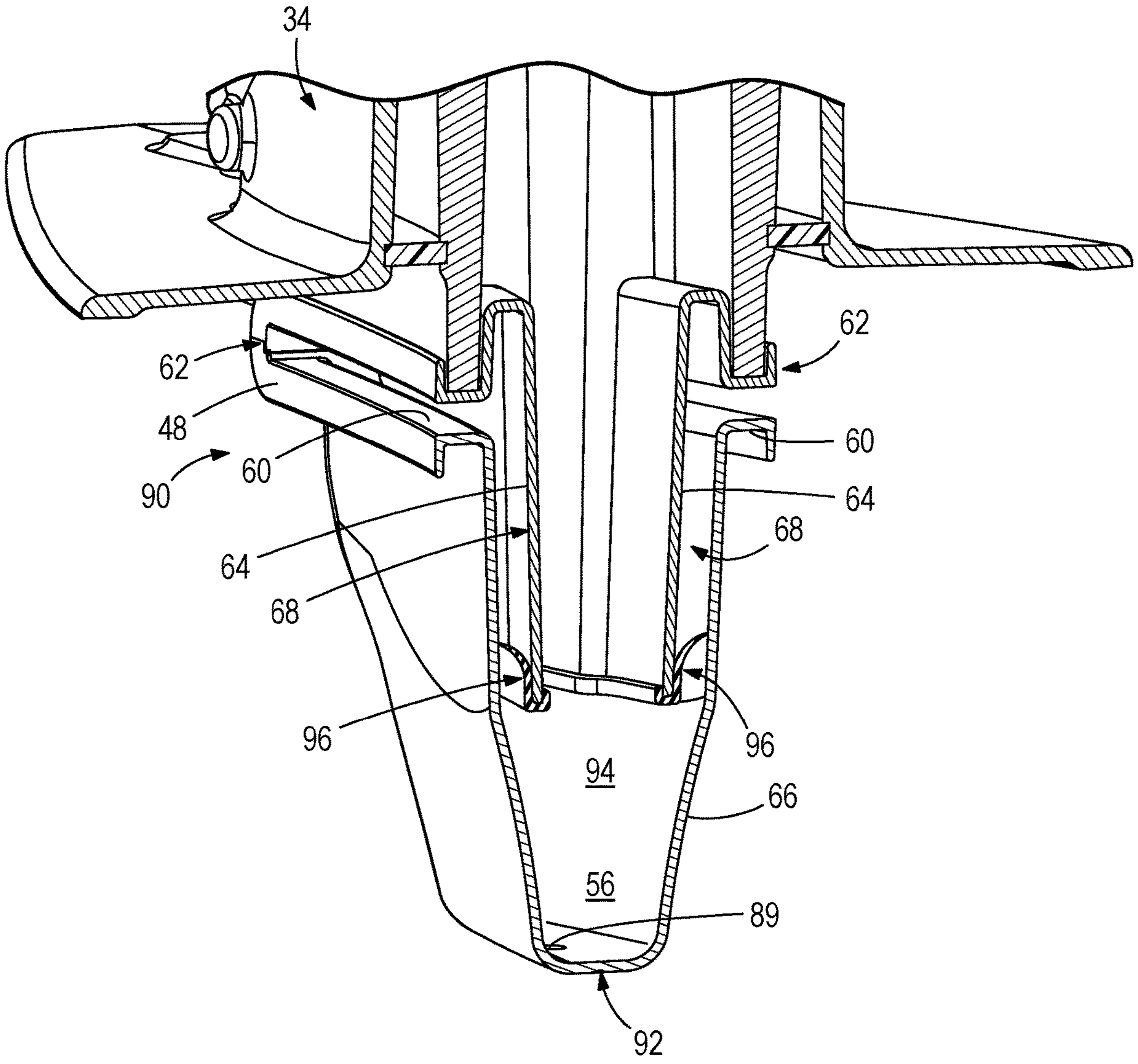
FIG. 11 is a view of section 11-11, taken in FIG. 9.
Figure 12:
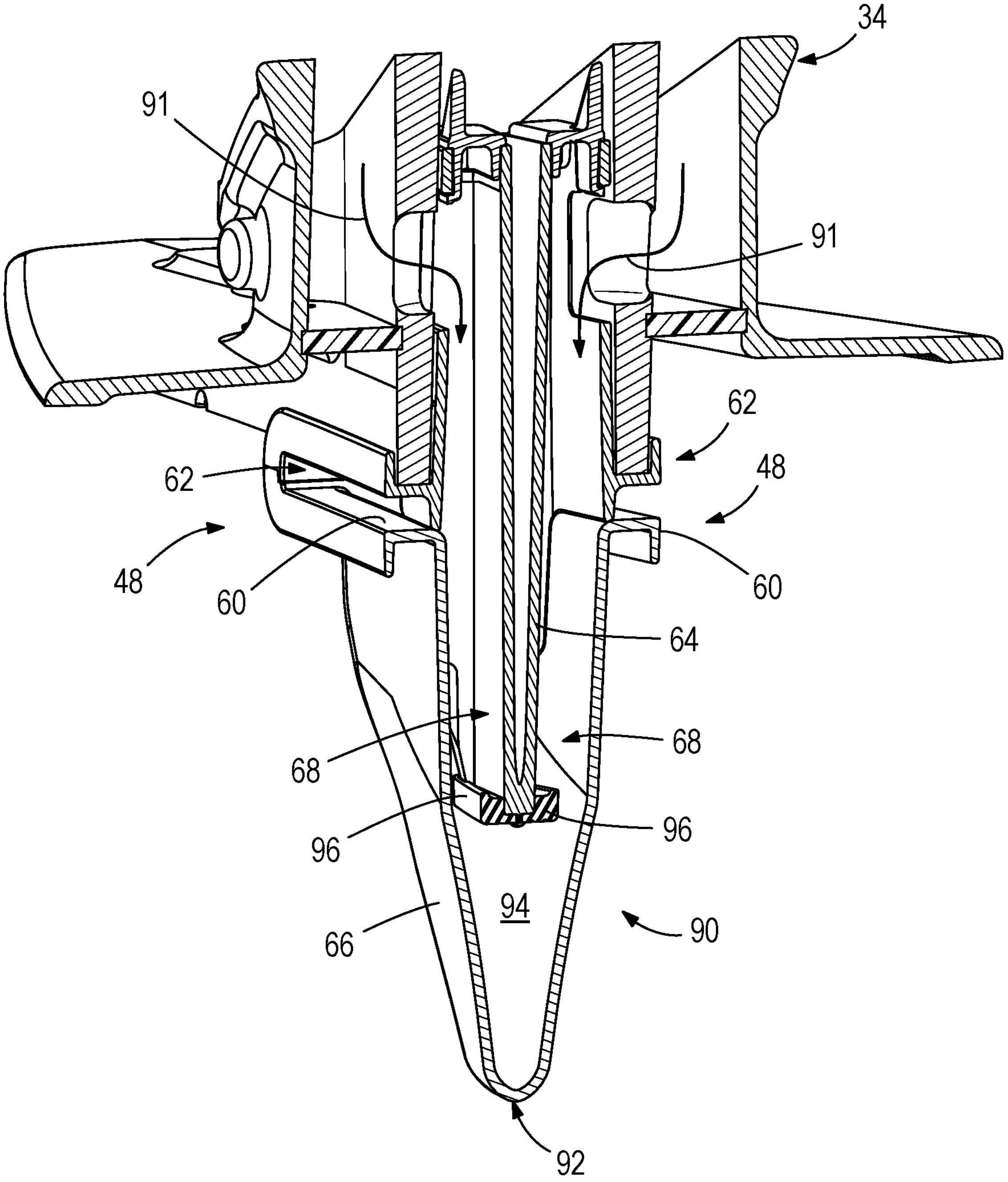
FIG. 12 is a view of section 12-12, taken in FIG. 9.

FIGS. 9-12 depict a second embodiment of a muffler 90 configured to reduce noise emanating from the exhaust outlet 48. Like reference numbers are applied to components that are similar to the first embodiment, muffler 30 shown in FIGS. 5-8. The muffler 90 differs from the first embodiment in that it has a bottom wall 92 that extends between outer sidewalls 66 and a forward sidewall 95 (see FIG. 9) that creates an interior 94 (see FIG. 10) through which the flow of exhaust gas 45 cannot vertically pass. In this example the flow of exhaust gas 45 flows downwardly next to and past the rearward side of the muffler 90, as shown at arrows 45. This is in contrast to the first embodiment described herein above wherein the flow of exhaust gas 45 flows downwardly through the muffler 30. As shown in FIG. 9, the flow of exhaust gas 49 is the portion of the flow of exhaust gas 45 that separates from the flow of exhaust gas 45 and flows, over the forward sidewall 95 and into the closed interior 94 of the expansion chamber 56. The muffler 90 also differs from the muffler 30 shown in FIGS. 5-8 in that the muffler 90 has port and starboard outlet channels 62 that are laterally oriented in the port and starboard directions, instead of aftwardly, so that the flow of exhaust gas 49 is discharged laterally in the port and starboard directions.

The muffler 90 also includes feature wherein cooling water from the internal combustion engine is used to muffle the sound of the flow of exhaust gas 49 (commonly referred to in the art as "water-lift muffler" functionality. In particular, a supply of cooling water 91 (see FIG. 5) from the internal combustion engine 12 is connected by a tube or similar conduit to water inlets 99 located above the expansion chamber 56. The configuration of the water inlets 99 can vary from what is shown, and in the illustrated example are connected to the port and starboard passageways 68 (see FIG. 12) so that the cooling water drains 91 by gravity down the port and starboard passageways 68 into the expansion chamber 56. The cooling water 91 that collects in the expansion chamber 56 will continue to muffle the exhaust gas noise associated with the exhaust outlet 48 when the exhaust outlet 48 is located above the surrounding seawater, for example when the outboard motor 10 is operated at above-idle speeds and the marine vessel is on plane in the seawater. The supply of cooling water 91 to the muffler 90 can be controlled, for example, by a thermostat associated with the internal combustion engine 12. Drain holes 89 can be selectively formed in the bottom wall 92 to control drainage of the cooling water 91 from the expansion chamber 56. The tortuous flow path through the port and starboard passageways 68 and the port and starboard outlet channels 62 also help retain and control the amount of the cooling water 91 in the expansion chamber 56.

The muffler 90 also has one or more lip seals 96 that cover the entrances to the port and starboard passageways 68 from the expansion chamber 56. In the illustrated example, port and starboard lip seals 96 are fixed to lower edges of the inner sidewalls 64 and extends across the entrances into an abutting engagement with outer sidewalls 66. The seals 96 and/or lower edges can have a continuous length or be broken up into several pieces or segments. The lip seals 96 are resilient members (e.g. flexible rubber) and are made soft enough to open under external pressure from the seawater surrounding the outboard motor and internal pressure from the flow of exhaust gas 49 to thereby allow the flow of exhaust gas 49 to exit the muffler 90 via the port and starboard passageways 68 and port and starboard outlet channels 62. The lip seals 96 are made rigid enough to remain closed under only the internal pressure from the flow of exhaust gas 49. This helps meter the flow of exhaust gas via the exhaust outlet 48. The lip seals 96 thus can be included to provide added attenuation. When the lip seals 96 are underwater (for example when the outboard motor is operated at idle speed), the lip seals 96 are pushed out of the way under the external force of the water, which is acceptable because the exhaust outlet 48 is under the water. The lip seals 96 flex and allow the exhaust gas to flow up through the muffler 90.

Figure 14:
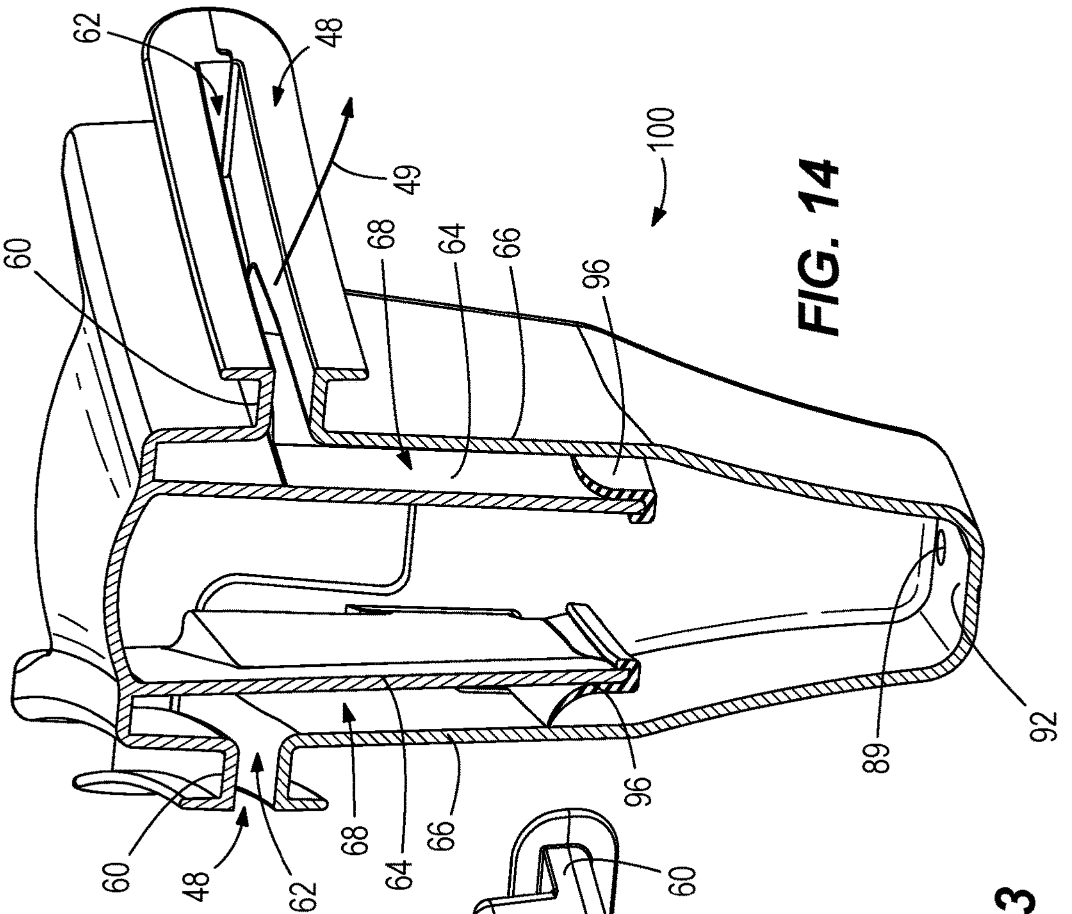
FIG. 14 is a view of section 14-14, taken in FIG. 13.
Figure 13:
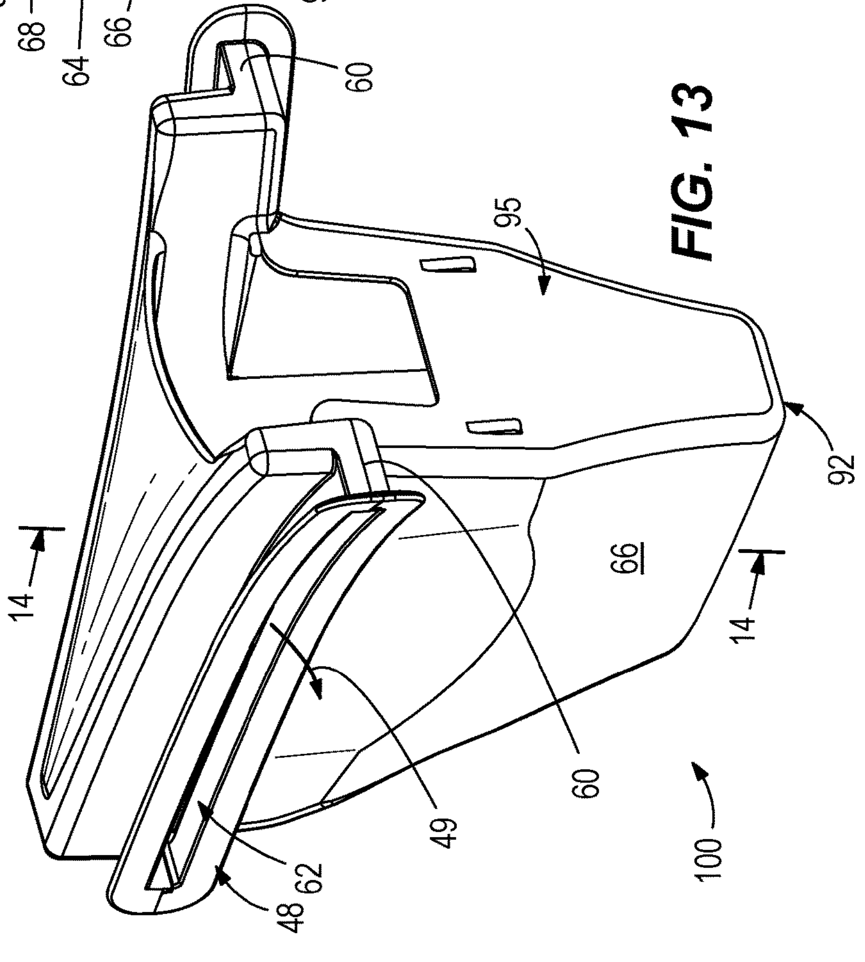
FIG. 13 is a perspective view of a third embodiment of a muffler configured to reduce exhaust gas noise emanating from outboard motor via the exhaust outlet.

FIGS. 13 and 14 depict a third embodiment of the muffler 100, which is similar to the muffler 90, but omits the water lift features. Like reference numbers are applied to similar components. The lip seals 96 help limit exhaust noise from exiting the exhaust outlet 48.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The invention claimed is:

1. A marine drive for propelling a marine vessel in water, the marine drive comprising:

an engine;

a first exhaust outlet configured to discharge a first flow of exhaust gas from the engine to the water, wherein the marine drive is configured such that the first exhaust outlet is located in the water when the marine drive is at rest and operated at an idle speed;

a second exhaust outlet located above the first exhaust outlet and configured to discharge a second flow of exhaust gas from the engine to the water, wherein the marine drive is further configured such that the second exhaust outlet is located in the water when the marine drive is at rest and operated at an idle speed; and a muffler configured to reduce noise emanating from the second exhaust outlet, wherein the muffler includes an expansion chamber configured to promote expansion of the second flow of exhaust gas, the muffler being configured to re-route the second flow of exhaust gas upwardly from the expansion chamber to the second exhaust outlet.

2. The marine drive according to claim 1, further comprising a third exhaust outlet located above the second exhaust outlet and configured to discharge a third flow of exhaust gas from the engine to atmosphere, wherein the marine drive is further configured such that the third exhaust outlet is located out of the water when the marine drive is at rest or operated at idle speed.

3. The marine drive according to claim 1, wherein the second exhaust outlet is located above the water when the marine drive is operated at an above-idle speed.

4. The marine drive according to claim 1, wherein the marine drive comprises a driveshaft housing and a gearcase below the driveshaft housing, and wherein the muffler is sandwiched between the driveshaft housing or an extension on the driveshaft housing and the gearcase.

5. The marine drive according to claim 1, wherein the marine drive comprises a driveshaft housing and a gearcase located below the driveshaft housing, and wherein the muffler includes a housing that is separate from and located in the gearcase.

6. The marine drive according to claim 5, wherein the expansion chamber also provides a pathway for the first flow of exhaust gas.

7. The marine drive according to claim 5, wherein the housing comprises at least one wing that extends from the expansion chamber and is sandwiched between the driveshaft housing and the gearcase.

8. The marine drive according to claim 7, wherein the at least one wing is one of port and starboard wings that extend from the expansion chamber and are sandwiched between the driveshaft housing and the gearcase.

9. The marine drive according to claim 1, wherein the marine drive is an outboard marine drive.

10. A marine drive for propelling a marine vessel in water, the marine drive comprising:

an engine:

a first exhaust outlet configured to discharge a first flow of exhaust gas from the engine to the water, wherein the marine drive is configured such that the first exhaust outlet is located in the water when the marine drive is at rest and operated at an idle speed:

a second exhaust outlet located above the first exhaust outlet and configured to discharge a second flow of exhaust gas from the engine to the water, wherein the marine drive is further configured such that the second exhaust outlet is located in the water when the marine drive is at rest and operated at an idle speed; and a muffler configured to reduce noise emanating from the second exhaust outlet, wherein the muffler includes an expansion chamber configured to promote expansion of the second flow of exhaust gas, and wherein the second flow of exhaust gas is re-routed upwardly from the expansion chamber along both port and starboard sides of the marine drive.

11. A marine drive for propelling a marine vessel in water, the marine drive comprising:

an engine;

a driveshaft housing;

a gearcase located below the driveshaft housing;

a first exhaust outlet configured to discharge a first flow of exhaust gas from the engine to the water, wherein the first exhaust outlet is located in the water when the marine drive is at rest and operated at an idle speed:

a second exhaust outlet located above the first exhaust outlet and configured to discharge a second flow of exhaust gas from the engine to the water, wherein the second exhaust outlet is located in the water when the marine drive is at rest and operated at an idle speed; and a muffler configured to reduce exhaust noise emanating from the second exhaust outlet, the muffler including a housing that is separate from and located in the gearcase and configured to re-route the exhaust gas upwardly through a tortuous path from the gearcase to the second exhaust outlet.

12. The marine drive according to claim 11, wherein the housing comprises an expansion chamber for receiving and facilitating expansion of exhaust gas and opposing wings laterally extending from opposite sides of the expansion chamber.

13. The marine drive according to claim 12, wherein the housing further comprises opposing outlet channels formed through the opposing wings, respectively, wherein the expansion chamber comprises inner and outer sidewalls, and wherein opposing passageways are defined between the inner and outer sidewalls, respectively, the opposing passageways being configured to convey exhaust gas from the expansion chamber to the opposing outlet channels, respectively, for discharge from the muffler.

14. The marine drive according to claim 13, wherein the housing comprises a top portion nested in a bottom portion, wherein the top portion comprises the inner sidewall and wherein the bottom portion comprises the outer sidewall.

15. The marine drive according to claim 11, wherein the housing is configured to re-route the second flow of exhaust via a tortuous path.

16. The marine drive according to claim 11, wherein the housing is configured to be sandwiched between a gearcase housing of the marine drive or an extension thereof and one of a driveshaft housing of the marine drive or an extension thereof.

17. The marine drive according to claim 11, wherein the housing provides a pathway for the first flow of exhaust gas to the first exhaust outlet on the marine drive and provides a pathway for the second flow of exhaust gas to the second exhaust outlet on the marine drive.

18. The marine drive according to claim 11, wherein the housing is configured to contain water which muffles the exhaust noise emanating from the muffler.

19. The marine drive according to claim 11, wherein the marine drive comprises an outboard motor.

* * * * *